US008909898B2

(12) United States Patent
Durham et al.

(10) Patent No.: US 8,909,898 B2
(45) Date of Patent: Dec. 9, 2014

(54) COPY EQUIVALENT PROTECTION USING SECURE PAGE FLIPPING FOR SOFTWARE COMPONENTS WITHIN AN EXECUTION ENVIRONMENT

(71) Applicant: Intel Corporation, Santa Clara, CA (US)

(72) Inventors: David Durham, Beaverton, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/860,912

(22) Filed: Apr. 11, 2013

(65) Prior Publication Data

US 2013/0298120 A1   Nov. 7, 2013

Related U.S. Application Data

(62) Division of application No. 12/164,489, filed on Jun. 30, 2008, now Pat. No. 8,423,747.

(51) Int. Cl.
*G06F 12/00*  (2006.01)
*G06F 12/14*  (2006.01)
*G06F 9/455*  (2006.01)

(52) U.S. Cl.
CPC ............ *G06F 9/455* (2013.01); *G06F 12/145* (2013.01); *G06F 12/1491* (2013.01)
USPC ............................... 711/203; 711/202; 711/6

(58) Field of Classification Search
None
See application file for complete search history.

(56) References Cited

U.S. PATENT DOCUMENTS

| 7,395,405 | B2 | 7/2008 | Anderson |
| 8,176,279 | B2 * | 5/2012 | Farrell et al. ................ 711/163 |
| 2006/0206658 | A1 | 9/2006 | Hendel |
| 2007/0006175 | A1 | 1/2007 | Durham |
| 2008/0244206 | A1 * | 10/2008 | Heo et al. .................... 711/163 |
| 2009/0006714 | A1 | 1/2009 | Durham |
| 2009/0172330 | A1 | 7/2009 | Dewan |

* cited by examiner

*Primary Examiner* — Matthew Bradley
*Assistant Examiner* — Daniel Tsui
(74) *Attorney, Agent, or Firm* — Trop, Pruner & Hu, P.C.

(57) ABSTRACT

Embodiments of copy equivalent protection using secure page flipping for software components within an execution environment are generally described herein. An embodiment includes the ability for a Virtual Machine Monitor (VMM), Operating System Monitor, or other underlying platform capability to restrict memory regions for access only by specifically authenticated, authorized and verified software components, even when part of an otherwise compromised operating system environment. In an embodiment, an embedded VM is allowed to directly manipulate page table mappings so that, even without running the VMM or obtaining VMXRoot privilege, the embedded VM can directly flip pages of memory into its direct/exclusive control and back. Other embodiments may be described and claimed.

10 Claims, 7 Drawing Sheets

US 8,909,898 B2

COPY EQUIVALENT PROTECTION USING SECURE PAGE FLIPPING FOR SOFTWARE COMPONENTS WITHIN AN EXECUTION ENVIRONMENT

CROSS-REFERENCE TO RELATED APPLICATIONS

This application is a divisional of U.S. patent application Ser. No. 12/164,489, filed Jun. 30, 2008, the content of which is hereby incorporated by reference.

This application is related to U.S. patent application Ser. No. 11/173,851, filed on Jun. 30, 2005 and titled "SIGNED MANIFEST FOR RUN-TIME VERIFICATION OF SOFTWARE PROGRAM IDENTITY AND INTEGRITY"; U.S. patent application Ser. No. 11/322,669, filed on Dec. 30, 2005 and titled "IDENTIFIER ASSOCIATED WITH MEMORY LOCATIONS FOR MANAGING MEMORY ACCESSES"; and U.S. patent application Ser. No. 11/395,488, filed on Mar. 30, 2006 and titled "INTRA-PARTITIONING OF SOFTWARE COMPONENTS WITHIN AN EXECUTION ENVIRONMENT, all of which are incorporated herein by reference.

BACKGROUND

Not all virtual machines (VMs) are created equal. Some VMs have special security related functions that allow them exclusive access to data for some period of time. For example, an embedded VM used as a network security appliance (e.g., a firewall, VPN, intrusion detection system (IDS), intrusion prevention systems (IPS), etc.) may require exclusive access to network packet data after a guest VM creates it, but before it is given to a physical network device. As the packet transitions through the embedded VM, access from the originating guest VM needs to be restricted until after the embedded VM has completed its operations and/or the packet has been transmitted by the network interface device, for example.

In an example where the embedded VM is used as a firewall, the embedded VM may examine a guest VM's packet data. Here, if the embedded VM determines that the packet data conforms to administrative policy, the packet is allowed to continue onto the network interface device. Prior to the packet being sent by the network interface device to the network, malicious code in the guest VM may change the contents of the packet to something that does not conform to administrative policy, thus defeating the security function of the embedded VM.

To help remedy the above issue regarding malicious code, several solutions have been proposed. One solution involves having the embedded VM copy the packet contents from the guest VM memory to memory that is only accessible by the embedded VM. However, such copies of content can be expensive. Another solution involves having the embedded VM request to the virtual machine monitor (VMM) that a particular page or memory region be mapped (or flipped) into its address space for exclusive access by the embedded VM. Unfortunately, this VMM interaction by the embedded VM may also be expensive.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
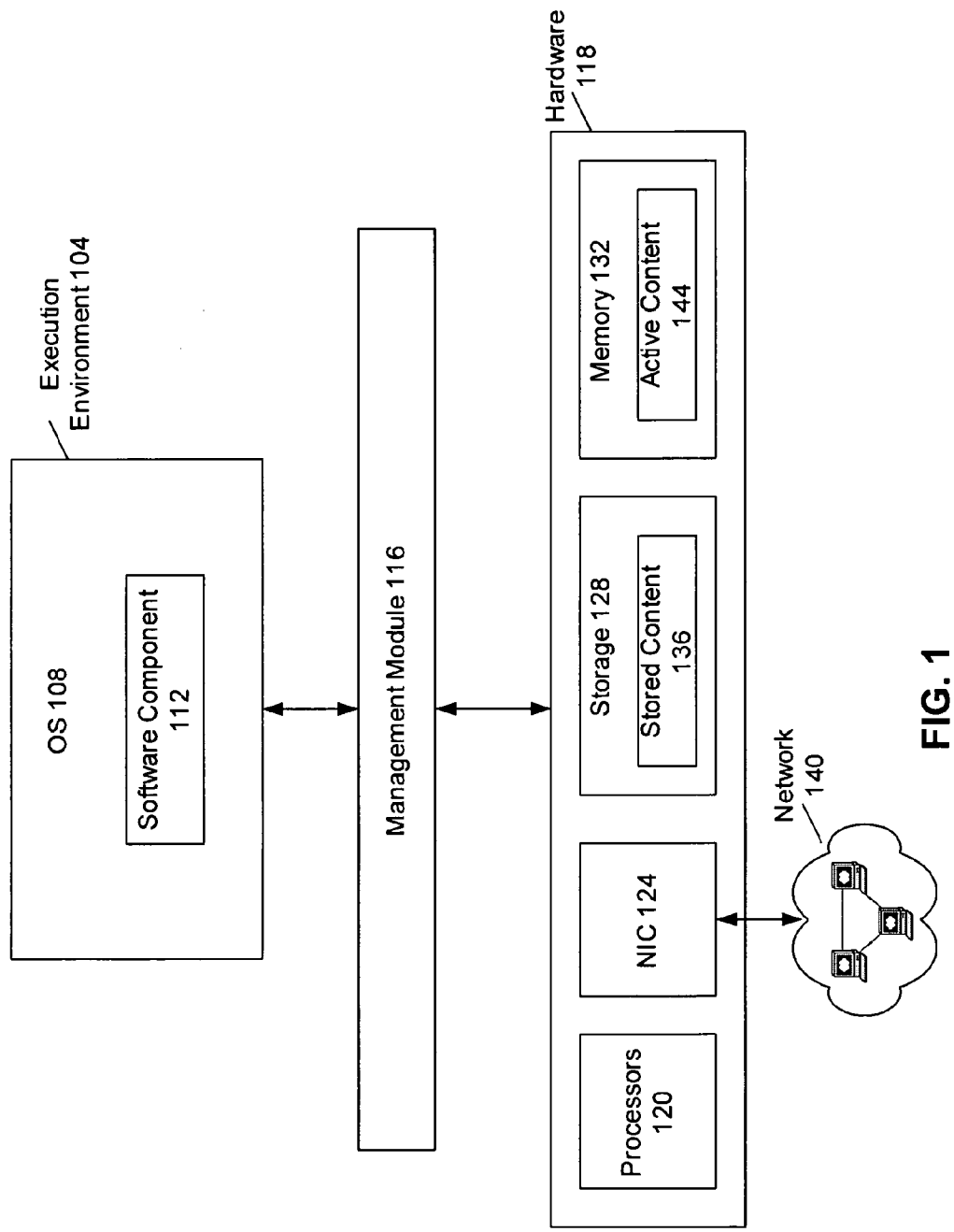
FIG. 1 illustrates a platform for software components within an execution environment, in accordance with an embodiment of the present invention.

Embodiments of the present invention may provide for copy equivalent protection using secure page flipping for software components within an execution environment. In embodiments, the invention allows an embedded virtual machine (VM) used as a security network appliance (e.g., a firewall, VPN, intrusion detection system (IDS), intrusion prevention systems (IPS), etc.) to efficiently have exclusive access to data for some period of time. Here, in embodiments, the embedded VM is allowed to directly manipulate page table mappings so that, even without running the virtual machine monitor (VMM) or obtaining VMXRoot privilege, the embedded VM can directly flip pages of memory into its direct/exclusive control and back.

As described above, an embedded VM used as a network security appliance may require exclusive access to network packet data after a guest VM creates it, but before it is given to a physical network device. As the packet transitions through the embedded VM, access from the originating guest VM needs to be restricted until after the embedded VM has completed its operations and/or the packet has been transmitted by the network interface device, for example. In an example where the embedded VM is used as a firewall, the embedded VM may examine a guest VM's packet data. Here, if the embedded VM determines that the packet data conforms to administrative policy, the packet is allowed to continue onto the network interface device. Prior to the packet being sent by the network interface device to the network, malicious code in the guest VM may change the contents of the packet to something that does not conform to administrative policy, thus defeating the security function of the embedded VM. Embodiments of the invention help to more efficiently remedy the above issue regarding malicious code by allowing the embedded VM to directly manipulate page table mappings so that, even without running the VMM or obtaining VMXRoot privilege, the embedded VM can directly flip pages of memory into its direct/exclusive control and back. Other embodiments of the invention are also described herein.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a platform 100 for software components within an execution environment to support embodiments of the invention. The platform 100 may have an execution environment 104, which may be the domain of an executing operating system (OS) 108. The OS 108 may be a component configured to execute and control general operation of other components within the execution environment 104, such as the software component 112, subject to intra-partition memory access protections provided to selected components by an underlying management module 116, to be discussed in further detail below.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code). Alternatively, in embodiments, the component 112 may be an application process, thread, or other user space program, service or library.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In addition to intra-partitioning selected components of the execution environment 104, the management module 116 may arbitrate general component access to hardware resources 118 such as one or more processor(s) 120, network interface controller (NIC) 124, storage 128, and/or memory 132.

The processor(s) 120 may execute programming instructions of components of the platform 100. The processor(s) 120 may be single and/or multiple-core processor(s), controller(s), application specific integrated circuit(s) (ASIC(s)), etc.

In an embodiment, storage 128 may represent non-volatile storage to store persistent content to be used for the execution of the components on the platform 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the platform 100 or it may be accessible by, but not necessarily a part of, the platform 100. For example, the storage 128 may be accessed by the platform 100 over a network 140 via the network interface controller 124.

Upon a load request, e.g., from a loading component or agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the platform 100. In various embodiments, the memory 132 may include RAM, dynamic RAM (DRAM), static RAM (SRAM), synchronous DRAM (SDRAM), dual-data rate RAM (DDRRAM), cache, etc.

In some embodiments, the memory 132 may organize content stored therein into a number of groups of memory locations. These organizational groups, which may be fixed and/or variable sized, may facilitate virtual memory management. The groups of memory locations may be pages, segments, or a combination thereof.

A virtual memory utilizing paging may facilitate the emulation of a large logical/linear address space with a smaller physical memory page. Therefore, the execution environment 104 may provide a virtual execution environment in which the components may operate, which may then be mapped into physical pages of the memory 132. Page tables maintained by the OS 108 and/or management module 116 may map the logical/linear addresses provided by components of the execution environment 104 to physical address of the memory 132. More details of the implementation of paging, and in particular paging with respect to intra-partitioning of components, are provided below in accordance with embodiments of this invention.

In various embodiments, the component 112, or portions thereof, may be selected for intra-partitioning to support copy equivalent protection using secure page flipping. Here, the management module 116 may identify and partition off portions of the component 112 to control access by the OS 108 or other components to the component 112. Partitioned portions may include any portion, up to all, of the particular component. A partitioned portion may be sequestered, either physically or virtually, from other components within the same execution environment, such that intra-execution environment accesses may be monitored and restricted, if necessary, by the underlying platform. Intra-partitioning may facilitate insulation of, e.g., component 112 from the OS 108, without requiring that the component 112 operate in an entirely separate execution environment, with a separate OS. Intra-partitioning may also afford the component 112 a level of protection from other components, even those of similar or higher privilege levels, within the execution environment 104 that may be compromised in some manner, e.g., by malware, rootkits, critical runtime failures, etc. Embodiments of this invention may provide for this protection and copy equivalent protection using secure page flipping while still allowing permitted interactions between the component 112 and other components, e.g., the OS 108, of the execution environment 104. Controlling access by the OS 108 to the component 112 may include various levels of access restrictions, as will be discussed below in further detail.

In various embodiments, intra-partitioning of components to support copy equivalent protection using secure page flipping may be useful in a platform having multiple execution environments, such as virtual machines operating in a virtualization technology (VT) enabled platform. In such an embodiment, a management module may include, or be a part of, a virtual machine monitor (VMM). For example, in embodiments, management module 116 may be implemented as a hypervisor-based module.

In a typical VT enabled platform, the physical memory for the VMM and the VM is separated by virtual memory such that one VM does not see the physical memory used by the VMM or other VMs. The VMM runs in the highest privilege mode, VMXRoot, with direct access to processor register state while the VM runs in a guest mode that sees virtual processor state and has access only to a view of memory allowed by the VMM using shadow/nested page tables controlled exclusively by the VMM.

As will be described in more detail below, embodiments of the invention modify this approach to allow a special "embedded" VM to allocate a portion of its own memory and then to pass the virtual address and size of the allocated memory to the VMM via a VM Call. In the VM Call, the VMM maps the physical mappings of its active page table (APT) (shadow or nested) to this memory region. This mapping effectively gives the embedded VM access to these internal VMM data structures (i.e., shadow/nested page tables of the VMM). Here, the VMM replaces the physical addresses in the embedded VM's page table entries for the allocated memory range (corresponding to the virtual addresses received from the embedded VM via the VM Call) with the physical addresses of the VMM's shadow/nested page tables. Now, the embedded VM can access the VMM's shadow/nested page table by reading or writing to the allocated virtual addresses.

Figure 2:
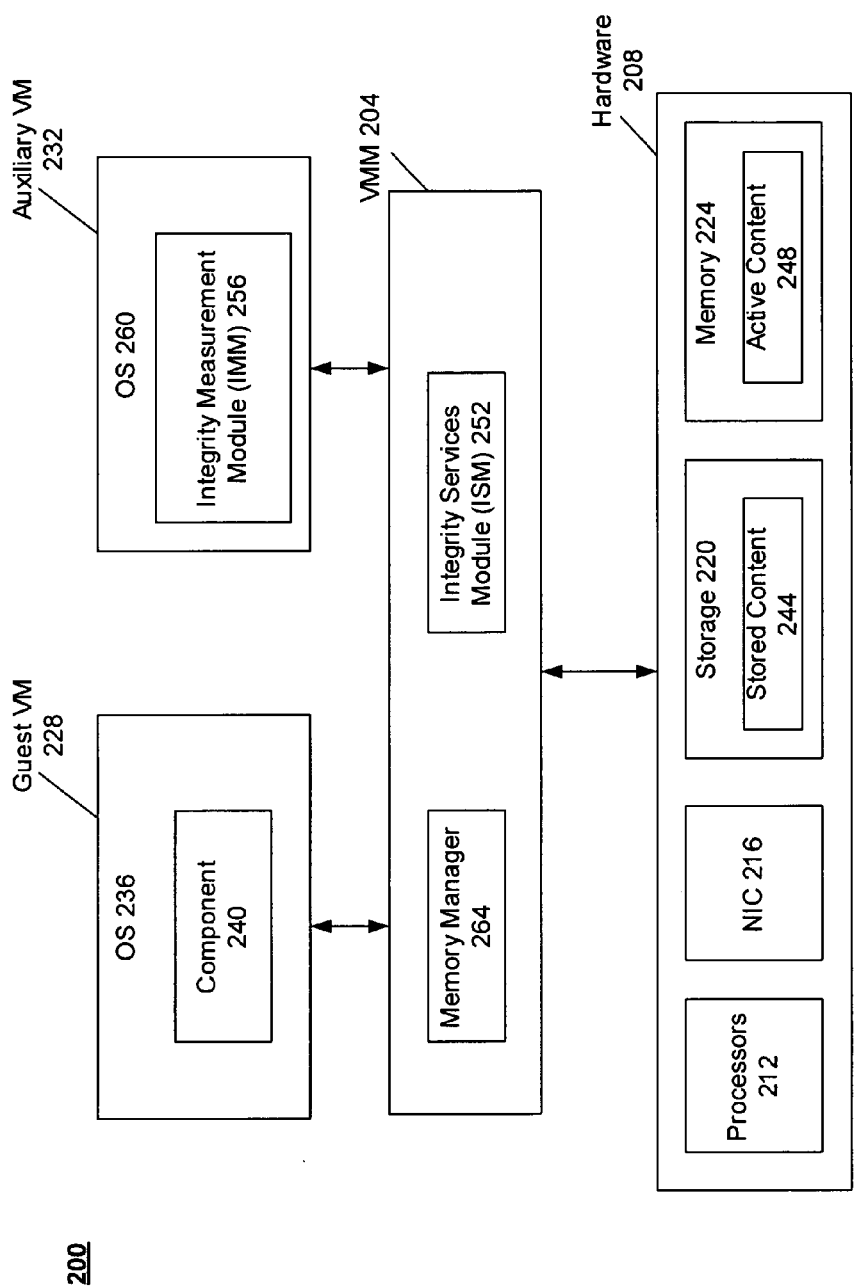
FIG. 2 illustrates a platform utilizing virtualization to provide parallel execution environments in accordance with a VT enabled platform, in accordance with an embodiment of the present invention.

FIG. 2 illustrates a platform 200 utilizing virtualization to provide parallel execution environments in accordance with a VT enabled platform. In various embodiments, the platform 200 may be similar to, and substantially interchangeable with, the platform 100. Furthermore, elements described below may be similar to, and substantially interchangeable with, like-named elements described above, and vice versa.

In this embodiment a management module, e.g., virtual machine monitor (VMM) 204, on the platform 200 may present multiple abstractions and/or views of the platform hardware 208, e.g., one or more processor(s) 212, network interface controller (NIC) 216, storage 220, and/or memory 224, to the one or more independently operating execution environments, or "virtual machines (VMs)," e.g., guest VM 228 and auxiliary VM 232. The auxiliary VM 232 may be configured to execute code independently and securely isolated from the guest VM 228 and may prevent components of the guest VM 228 from performing operations that would alter, modify, read, or otherwise affect the components of the auxiliary VM 232. While the platform 200 shows two VMs, other embodiments may employ any number of VMs.

The components operating in the guest VM 228 and auxiliary VM 232 may each operate as if they were running on a dedicated computer rather than a virtual machine. That is, components operating in the guest VM 228 and auxiliary VM 232 may each expect to control various events and have complete access to hardware 208. The VMM 204 may manage VM access to the hardware 208. The VMM 204 may be implemented in software (e.g., as a stand-alone program and/or a component of a host operating system), hardware, firmware, and/or any combination thereof.

The guest VM 228 may include an OS 236 and component 240. Upon a designated event, the VMM 204 may identify and partition off portions of the component 240 to control access to the partitioned portions by the OS 236 or other components. One or more of these partitioned portions may be used to represent a secure area in memory. In various embodiments, a designated event may be when stored content 244 is loaded from storage 220 to memory 224, as active content 248. However, in various embodiments, other designated events may be additionally/alternatively used.

Figure 3:
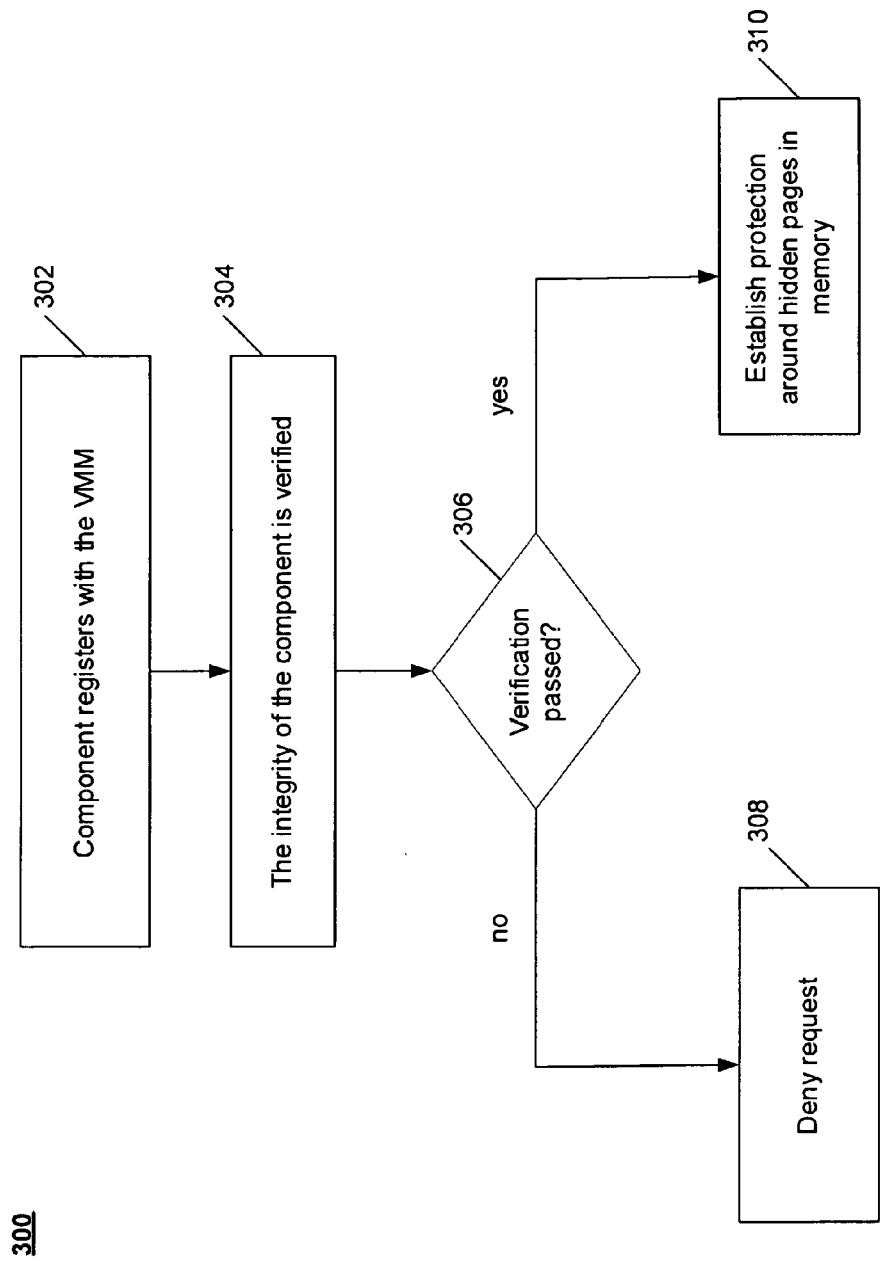
FIG. 3 illustrates operational phases of software components within an execution environment, in accordance with an embodiment of the present invention.

Intra-partition based protections may be provided to component 240 as described in FIG. 3 in accordance with an embodiment of this invention. Operational phases shown in FIG. 3 may be referenced by numerals within parentheses. Referring to FIG. 3, the component 240 may register with the VMM 204, and more particularly, with an integrity services module (ISM) 252 of the VMM 204 for protection (block 302). In various embodiments, the registration may take place upon an occurrence of a registration event, e.g., loading of the active content 248 into memory 224, periodically, and/or in some other event-driven manner. In various embodiments, the registration may be initiated by the component 240, another component within the VM 228, e.g., the OS 236, the VMM 204, or a component of the VM 232.

Upon receiving the registration, the ISM 252 may cooperate with an integrity measurement module (IMM) 256 operating in the VM 232 to authenticate and verify the integrity of the component 240 (block 304). Authentication and verification of the integrity of the component 240 may help to prevent unauthorized modification and/or malicious termination, and may ensure that only recognized components may be afforded protection as defined by an administrator, user or other policy. The IMM 256 may operate in the VM domain 232 in the context of an OS 260, or in separate hardware and may, therefore, be largely independent of OS 236. By running outside of the context of the VM 228, the IMM 256 may have accurate and dependable memory measurement capabilities that may not be present, or possibly compromised, in the context of the OS 236. In other embodiments, IMM 256 may operate in the VM domain or guest VM 228. In other embodiments, IMM 256 may operate in the VMM 204.

The IMM 256 may provide the ISM 252 a response to the verification request such as pass, fail, pass w/qualification, fail w/qualification, etc. In various embodiments, qualifications may reflect degrees of integrity verification between pass and fail. The IMM 256 effectively identifies or authenticates the component and its data and assures that it is of the expected, correct form in memory.

In some embodiments, the active content 248 may include an integrity manifest, which may be a collection of information to be used in the verification of the integrity of the component 240. In various embodiments, the integrity manifest may include one or more integrity check values and/or relocation fix-up locations, covering the stored content 244, e.g., code store and/or static and/or configuration settings/data. The IMM 256 may access the integrity manifest from the active content 248 and verify that the component 240 corresponds, in total or in part, to the integrity manifest. The IMM 256 may verify the authenticity of the integrity manifest itself verifying a cryptographic signature over the integrity manifest structure to assure it is unaltered from its correct form. A comparison may be done of the images through, e.g., a byte-by-byte analysis or through analysis of cryptographic hashes.

In various embodiments, the IMM 256 may search for the active content 248 directly in the memory 224, e.g., through a direct memory access (DMA) or direct physical memory access. In various embodiments, the linear address of the component 240 may be provided to the IMM 256, e.g., through the ISM 252, and the IMM 256 may perform a virtual-to-physical mapping to identify the physical memory locations of the active content 248. In an embodiment, the VMM 204 may provide special interfaces to IMM 256 to provide access to active content 248.

In various embodiments, integrity measurement of the active content 248 may be conducted upon the initial registration, periodically, and/or in some other event-driven manner while the component 240 is executing. Integrity measurement upon initial registration request may help to determine that the initial state of the active content 248 and/or stored content 244 is as expected based on the state of the content at the time it was manufactured, or loaded last. The periodic or change-detected event-driven integrity measurements may help to detect attacks that inappropriately change the protected attributes of the active content 248 and/or stored content 244.

Further details of integrity measurements of components are described in U.S. patent application Ser. No. 11/173,851, filed Jun. 30, 2005, referred to and incorporated above.

The ISM 252 may receive a response from IMM 256 reflecting verification of integrity and location in memory of the active content 248 (block 306). If the verification fails, the ISM 252 denies the request and may trigger an alert (block 308). If the verification passes, the ISM 252 may cooperate with a memory manager 264 to intra-partition portions of the component 240 (block 310). Here, protection is established around one or more hidden pages in memory so they may only be accessed by the verified component and/or around the entirety of the component itself.

While FIG. 2 illustrates execution environments being virtual partitions, other embodiments may provide different execution environments through other mechanisms, e.g., using a service processor, protected execution mode (such as System Management Mode SMM or Secure Execution Mode SMX, for example) and/or an embedded microcontroller. In various embodiments, an auxiliary environment may be partitioned from a host environment via a variety of different types of partitions, including a virtualized partition (e.g., a virtual machine in a Virtualization Technology (VT) scheme), as shown above, and/or an entirely separate hardware partition (e.g., utilizing Active Management Technologies (AMT), "Manageability Engine" (ME), Platform Resource Layer (PRL) using sequestered platform resources, System Management Mode (SMM), and/or other comparable or similar technologies). In various embodiments, a VT platform may also be used to implement AMT, ME, and PRL technologies.

Figure 4:
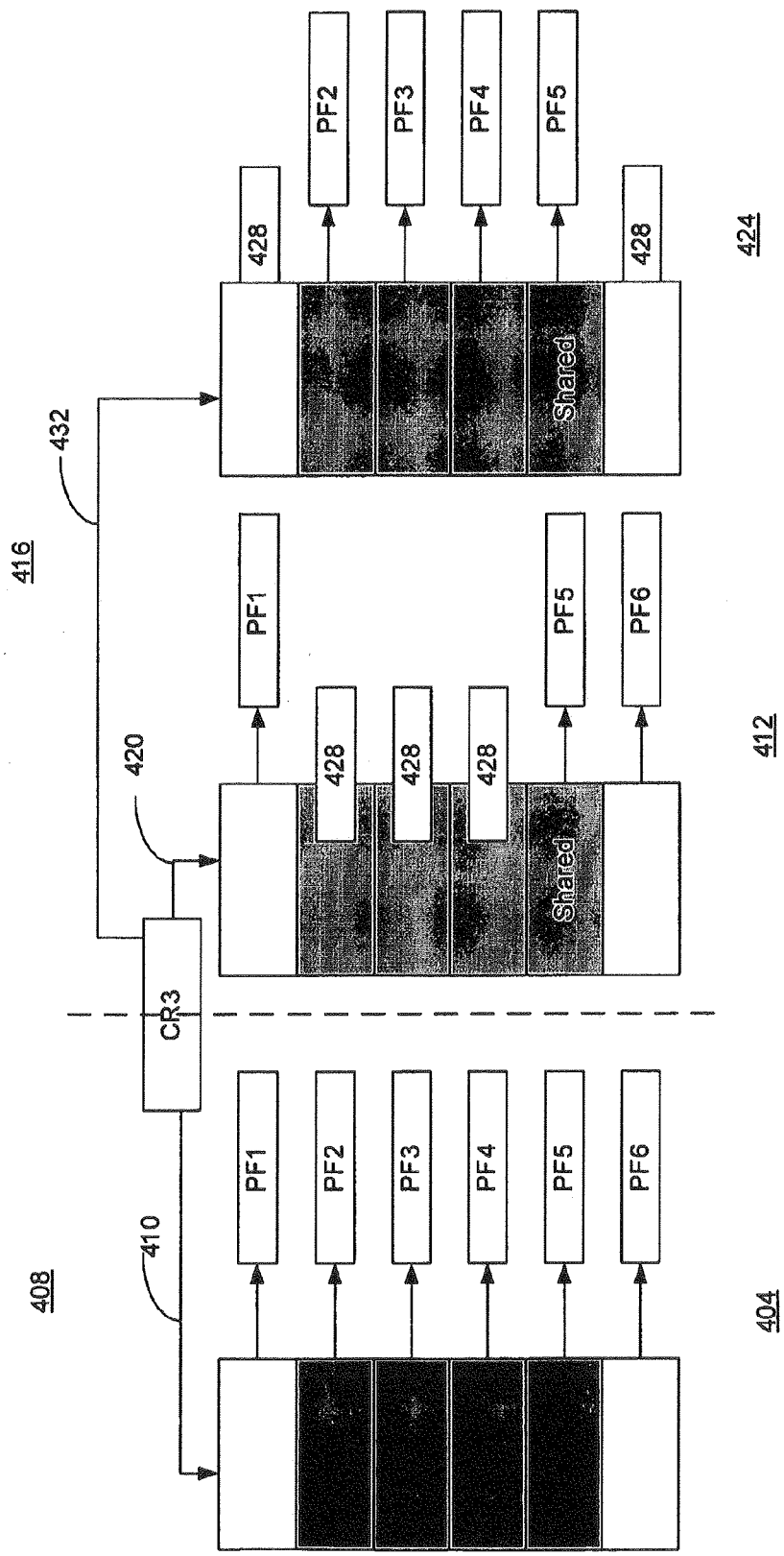
FIG. 4 illustrates intra-partitioning of portions of a component to provide copy equivalent protection, in accordance with an embodiment of the present invention.

FIG. 4 illustrates intra-partitioning of portions of the component 240 in accordance with an embodiment of this invention. In this embodiment, the OS 236 may create a guest page table (GPT) 404 in an OS domain 408 mapping linear addresses of components executing in the VM 228 to physical addresses, or page frames. Component 240 may be set to occupy the $2^{nd}$ through $5^{th}$ page table entries (PTEs), which refer to page frames having active content 248, e.g., PF2-PF5. As is the case in VT platforms, the VMM 204 may monitor and trap register pointer (e.g., CR3) changes. When the OS 236 creates the GPT 404 and provides a CR3 value 410 pointing to the GPT 404, the VMM 204 may trap on the CR3 change, create an active page table (APT) 412 (which may be a duplicate or shadow copy of the GPT 404) in the VMM domain 416, and change the CR3 value 410 to value 420 pointing to the APT 412. In this way, the VMM 204 can coordinate accesses to the memory 224 from a number of VMs, e.g., VM 228 and VM 232.

In this embodiment, the VMM 204 may also create a protected page table (PPT) 424. The VMM 204 may copy the page frames having the active content 248, e.g., PF2-PF5, into the PPT 424 and assign the page table entries (PTEs) that do not refer to those page frames, e.g., $1^{st}$ PTE and $6^{th}$ PTE, with access characteristics 428 to cause a page fault upon execution. Similarly the APT page mappings for the active content (e.g. $2^{nd}$ through the $4^{th}$ PTE corresponding to PF2-PF4) will have access characteristics to cause a page fault on execution from the active (or OS's) domain. In various embodiments, the access characteristics 428 may be 'not present,' 'execute disabled,' and/or 'read-only'. In an embodiment, the access characteristics 428 may be 'not present' or a combination of 'execute disable' and 'read-only' to prevent unauthorized modifications to the active content 248 from the VM 228. In various embodiments, the setting of the access characteristics 428 may be done by the VMM 204, requested by the authenticated/verified component 240, the IMM 256, and/or by hardware.

The VMM 204 may assign the PTEs of the APT 412 that refer to page frames having partitioned portions of the component 240, e.g., $2^{nd}$ PTE-$4^{th}$ PTE, with access characteristics 428. It may be noted that some page frames, e.g., PF5, may be shared between the partitioned and non-partitioned elements. Therefore, in an embodiment the $5^{th}$ PTE may not have access characteristics 428 set in either APT 412 or PPT 424.

In this embodiment, execution flow between the APT 412 and PPT 424 may be managed as follows. Initially, CR3 may have value 420 pointing to APT 412 representing the execution of the guest operating system. An execution instruction pointer (EIP) may start with the $1^{st}$ PTE of the APT 412 and, upon an attempted access of the $2^{nd}$ PTE, may cause a page fault due to the access characteristics 428. The VMM 204 may take control, and change CR3 from value 420 to value 432, pointing to the PPT 424. The EIP may resume operation at the $2^{nd}$ PTE of the PPT 424, which may be a partitioned element. The EIP may execute through the $3^{rd}$ PTE, the $4^{th}$ PTE and the $5^{th}$ PTE. When the EIP attempts to access the $6^{th}$ PTE, the access characteristics 428 may cause another page fault and the VMM 204 may switch the CR3 back to value 420, for access to the $6^{th}$ PTE from the APT 412.

In some embodiments, the VMM 204 may monitor the execution flow between the APT 412 and PPT 424 to verify that the points the EIP enters and/or exits the PPT 424 are as expected according to the integrity manifest for the component 240 or other policy. Verification that the EIP jumps into the PPT 424 at valid entry points and/or jumps out of the PPT 424 at valid exit points, could facilitate a determination that the component 240 and/or other components in the VM 228 are operating correctly. If the entry/exit point is not as expected, the VMM 204 may determine that the access attempt to the partitioned component 240 is unauthorized and may raise an exception, which in various embodiments could include rejecting the attempted access, redirecting the access attempt to a different or NULL memory region, reporting the rejected access attempt to the OS 236 (for example, by injecting an invalid instruction exception), triggering an interrupt, notifying a separate VM, sending a network notification, and/or causing a halt of the OS 236 as controlled by the VMM 204).

In various embodiments, the valid entry and/or exit points may be predetermined, e.g., at the time the component 240 is compiled, and/or may be dynamic. A dynamic entry and/or exit point may be created, e.g., when an interrupt occurs. For example, an interrupt may occur when the EIP is at the $3^{rd}$ PTE of the PPT 424, the VMM 204 may gain control, verify that the interrupt is authentic, and record the EIP value, processor register values, and call stack information for use as a dynamic exit point. The dynamic exit point may then serve as a valid entry point upon reentry to the partitioned elements of the PPT 424. Note that sensitive data in processor registers and the call stack may be stored as part of the dynamic exit point by the VMM 204 and cleaned/deleted before turning control back to the OS via the interrupt handler. This sensitive data may be restored by the VMM 204 when the corresponding dynamic entry point is executed on returning from the interrupt.

Additionally, in some embodiments an execution state (e.g., a stack state and/or a processor state, e.g., register values) may be recorded at an exit and verified upon reentry. This may provide some assurance that an unauthorized alteration/modification did not occur.

In some embodiments data for an execution state verification may include a copy of the entire state or an integrity check value (ICV) calculation. An ICV may be calculated on, for example, the in parameters of a stack frame by setting the out parameters to default values. Likewise, an ICV may be calculated on the out parameters by setting the in parameters to default values. If the entry/exit point and/or the execution state verification fail, the VMM 204 may issue an exception to the access attempt.

Furthermore, in some embodiments, the VMM 204 may verify that the element calling the partitioned elements, e.g., PF2-PF4, is permitted to access them. For example, the VMM 204 may receive a request from a component to access the partitioned elements. The VMM 204 may identify the component, reference access permissions associated with the partitioned elements, and raise an exception if the access permissions do not permit the identified component to access the partitioned elements.

It may be noted that the page tables shown and described in embodiments of this invention may be simplified for clarity of discussion. In various embodiments of this invention page tables may include multiple levels of indirection and thousands or even millions of entries. Furthermore, in various embodiments, entries at different levels may be identified differently than as identified in discussions herein. For example, on an IA-32 platform, the top level may be referred to as a page directory entry (PDE), while the bottom entry may be referred to as a page table entry (PTE). Extended or Nested Page Tables for protection, remapping, and/or segmentation of guest physical memory may also be used. The intra-partitioning discussed herein may be applied to any of these variations/extensions in accordance with embodiments of this invention.

Further embodiments of intra-partitioning of portions of the component 240 are described in U.S. patent application Ser. No. 11/395,488, filed on Mar. 30, 2006, referenced above.

Figure 5:
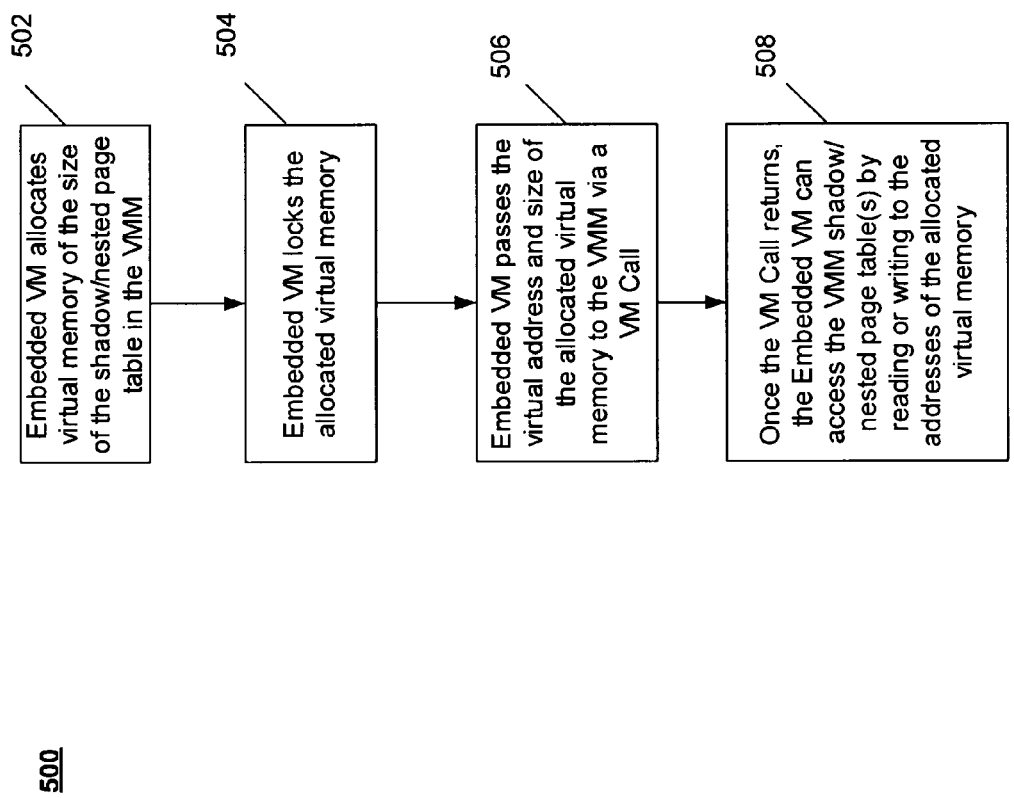
FIG. 5 illustrates operational phases of copy equivalent protection, in accordance with an embodiment of the present invention.
Figure 6:
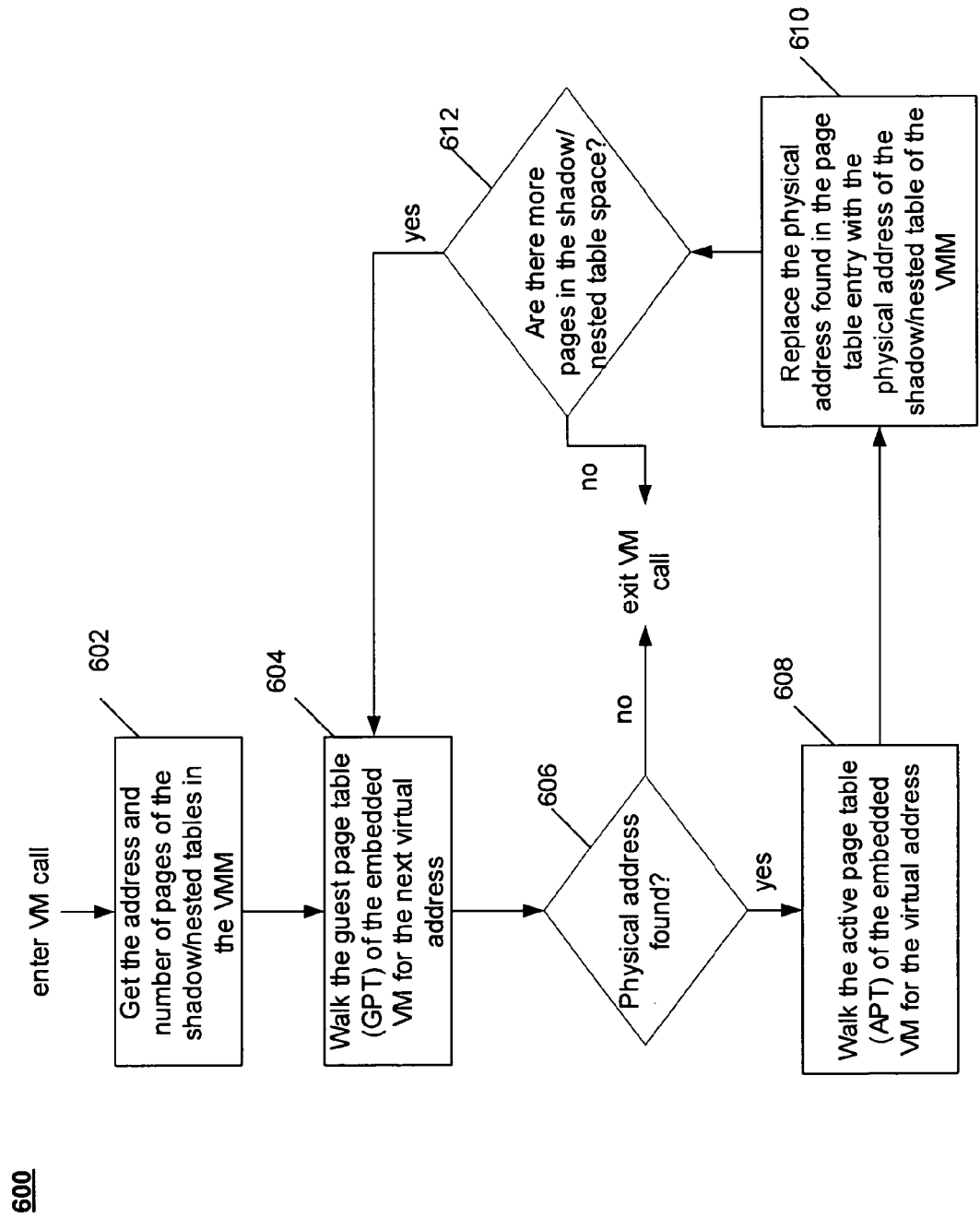
FIG. 6 illustrates the operational phases of a VM call, in accordance with an embodiment of the present invention.

FIGS. 5 and 6 illustrate operational phases of copy equivalent protection, in accordance with an embodiment of the present invention. Operational phases shown in FIGS. 5 and 6 may be referenced by numerals within parentheses.

In the VT enabled platform as described above with reference to FIGS. 2 and 3, the physical memory for the VMM and the VM is separated by virtual memory such that one VM does not see the physical memory used by the VMM or other VMs. The VMM runs in the highest privilege mode, VMXRoot, with direct access to processor register state while the VM runs in a guest mode that sees virtual processor state and has access only to a view of memory allowed by the VMM using shadow/nested page tables controlled exclusively by the VMM. Embodiments of the invention modify this approach to allow for copy equivalent protection, in accordance with an embodiment of the present invention.

Referring to a logic flow 500 of FIG. 5, an embedded VM allocates a portion of its own virtual memory of the size of the flat or shadow/nested page table in the VMM (block 502). The embedded VM then locks the allocated virtual memory (block 504). Locking of the virtual memory is needed so that the embedded VM manager does not try to remap the allocated virtual memory with physical memory (e.g., reassign the pages of the virtual memory or page them to disk). The previously allocated physical memory can remain unused. Other embodiments can avoid the need of the embedded VM maintaining memory for of the linear page table mappings by enabling new processor instructions that will allow an authorized embedded VM to manipulate the page tables and Translation Lookaside Buffer state directly.

The embedded VM passes the virtual address and size of the allocated virtual memory to the VMM via a VM Call (block 506). Once the VM Call returns, the embedded VM can access the VMM shadow/nested page table(s) by reading or writing to the addresses of the allocated virtual memory (block 508).

The VM Call is described next in more detail with reference to FIG. 6. Referring to a logic flow 600 of FIG. 6, in the VM Call, the address and number of pages of the flat or shadow/nested tables in the VMM are determined (block 602). The guest page table (GPT) of the embedded VM is walked for the next virtual address (block 604). If the physical address of the determined virtual address is not found, then the VM Call is exited (block 606). Typically, this should not happen since the embedded VM locked the allocated virtual memory (in block 604). Otherwise, if the physical address of the determined virtual address is found in block 606, the active page table (APT) of the embedded VM is walked for the virtual address (block 608). The physical address found in the page table entry is replaced with the physical address of the shadow/nested table of the VMM (block 610). If there are more pages in the shadow/nested table to be processed (block 612), then return to block 604 to determine the next virtual address. Otherwise, exit the VM call.

The mapping described in FIG. 6 effectively gives the embedded VM access to internal VMM data structures (i.e., shadow/nested page tables of the VMM). Here, the VMM replaces the physical addresses in the embedded VM's page table entries for the allocated memory range (corresponding to the virtual addresses received from the embedded VM via the VM Call) with the physical addresses of the VMM's shadow/nested page tables. Now, the embedded VM can access the VMM's shadow/nested page table by reading or writing to the allocated virtual addresses.

Figure 7:
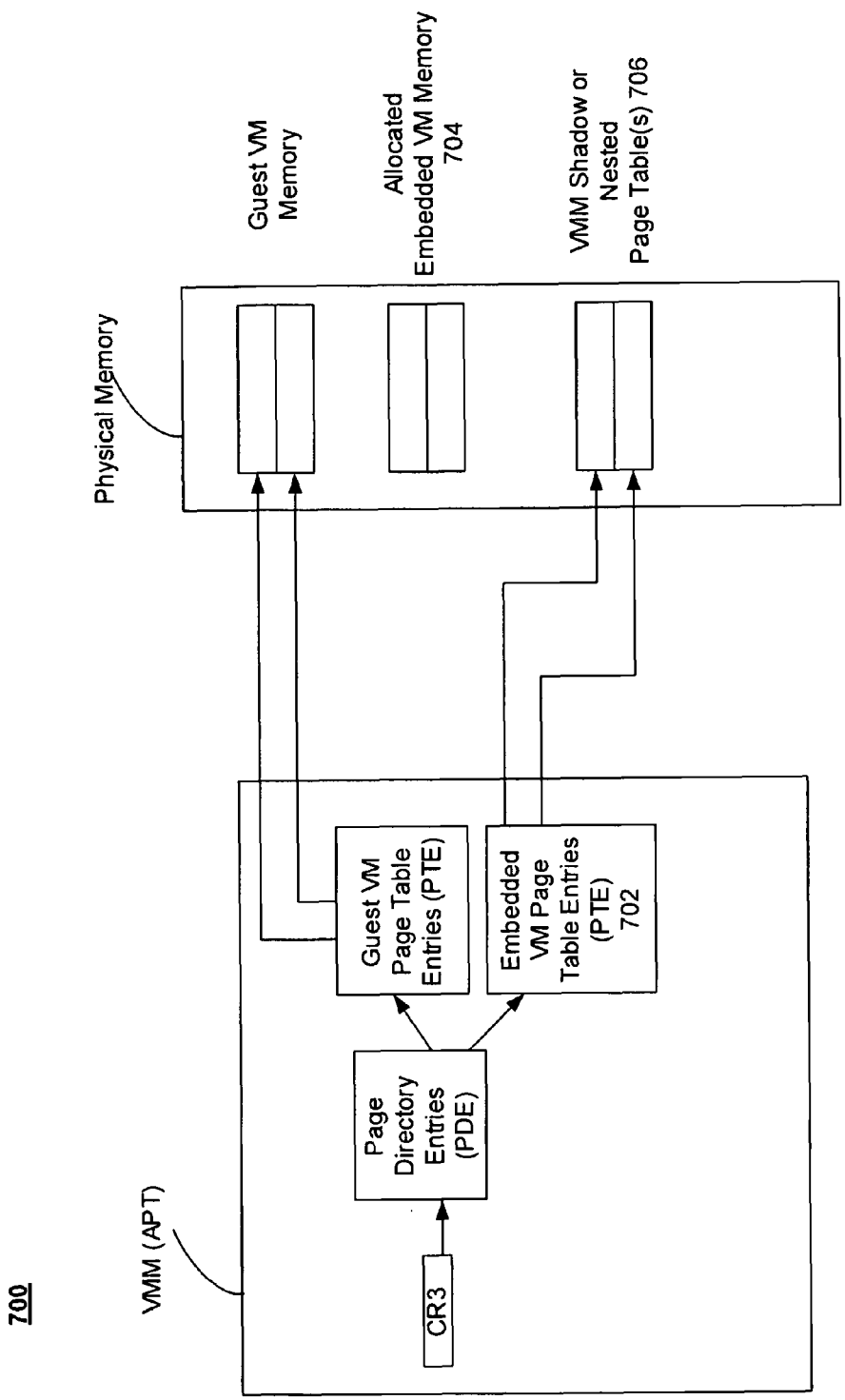
FIG. 7 illustrates the physical mapping of the VMM active page tables to a memory region of the embedded VM, in accordance with an embodiment of the present invention.

FIG. 7 illustrates a physical mapping 700 of the VMM active page tables to a memory region of the embedded VM, in accordance with an embodiment of the present invention. As shown in FIG. 7, embedded VM page table entries (PTE) 702 are now pointing to the physical memory of the VMM shadow or nested page table(s) 706 and not to the allocated embedded VM memory 704.

In embodiments, once the embedded VM has a pointer to the VMM active page tables, it can manipulate the active page tables like it can manipulate the guest page tables. For example, if the embedded VM wants exclusive access to a page, it can reset permissions in the Guest VM's active page table to 'read-only'. As a result, this reduces the number of VM Exits by manually modifying the active page tables and the guest page tables without having to rely on a VM Exit for every page fault. In other words, in VTLB1 if a kernel thread tries to access an unavailable page, it will take two page faults to percolate the modification to the TLB. The first fault will be bubbled up to the VM by the VMM since the VMM will see that the VM does not know about the page and will give a chance to the VM to update its page tables. Once that is done, the second page fault will force the VMM to synchronize the active page tables with the guest page tables. Thus, in embodiments of the invention, if the embedded VM modifies the active page tables when it modifies the guest page tables, it can avoid the page faults and the system will get the updated page table entries on the first TLB miss. As a result, there is a potential savings of two invalid page faults and a VM Exit. The embedded VM may also responsible for flushing any caches of the old page table state, for example, within a Translation Lookaside Buffer (TLB), to ensure that previous mappings for the page in question are no longer being used by any other processor or thread.

In embodiments, when the VM maps the physical pages of the VMM to the virtual memory of the VM itself, the code will execute in the context of a VM and not the VMM. This code enables the VM to properly update the data structures of the VMM without having to incur expensive VM Exits. In addition, this enables a given VM to modify the data structures of another VM without actually switching to the VM. Essentially, the VMM maps the physical memory of the second VM in the Map VM call and thus enabling the first VM to manipulate the data structures of the second VM.

In embodiments, the invention described herein provides security in that it enables an agent protected using VT Integrity Services (VIS) mechanisms to transition from unprotected to protected contexts or vice versa by directly manipulating the page table from the VM and thus avoiding the VM Exits.

In embodiments, memory conflicts are expected to rarely occur and thus allowing unmodified operating systems to function without any appreciation of the invention mechanisms described herein. Yet, embodiments of the invention may provide assistance in recovery from memory conflicts. For example, if a guest VM attempts to write to a page that was just marked as 'read-only' by the embedded VM, a VM Exit will occur. The VMM is now expected to resolve this conflict. One possible resolution is to notify the embedded VM that it should abandon its processing of the data and wait for the guest VM to complete its operations on the faulting page. Alternatively, the VMM can make a copy of the page the moment the guest VM accesses it so that the guest VM and the embedded VM now have their own copies of the page. The two pages can be merged back into one once the embedded VM completes its processing. Finally, the VMM can simply notify the embedded VM about the access attempt by the guest VM and allow the embedded VM to resolve the differences in the page conflict itself, byte-by-byte, as the guest VM modifies the page, or allow the embedded VM to specify which portions of the page it has exclusive access and which portions of the page may still be modified by the guest VM via segments.

In embodiments, the approach described above with reference to FIGS. 5-7 can be extended beyond memory management to code execution where the VMM replaces the physical address in the page table entry to the physical address of a function inside the VMM and thus enabling a VM to call the function directly. Also, in embodiments, multiple VMs can make VM Calls and the VMM can map the same physical memory to different virtual memory addresses in each VM and thus providing a shared memory interface across VMs that can be used without the expense of VMExits.

Various embodiments of the invention provide for processor extensions for inline page flipping via new a new architecture instruction that allows a page to be flipped without invoking the VMM (hypervisor/monitor) via a VM Call or VM Exit. In embodiments, the instruction takes a page reference in one VM or context, and changes the permissions in another context as referenced by a VM Identifier (VMID) or root extended page table (EPT). Here, the page reference is a guest VM's physical page mapping in the EPT structures. The VM or context requesting the change to the other must have read and write permissions to the page in question. The other VM or context whose mapping will change must already have a guest physical mapping for the same physical page. Its permissions can then be changed from 'read and write' to 'read-only' by the new instruction. Alternatively, both read and write permissions may be denied. In embodiments, on executing the instruction the processor changes the page table to reflect the permission change for all affected contexts and also ensures that any existing caches, for example, Translation Lookaside Buffers (TLBs), are updated to reflect the permission change as well. These TLB updates may be reflected across multiple processors and/or hardware threads on a multi-core or multi-hw-thread machine.

The above instruction is secure because the embedded VM does not need access to the VMM managed page table structures and can only flip permissions on pages that are already mapped to its local address space and the address space of the guest VM. The embedded VM needs its own permissions set appropriately on a particular page before it can flip the permissions on that page in another VM's page table structure.

The operation is safe because both contexts have mappings for the same physical page. If this were not the case, the instruction would fail and notify the VMM (hypervisor/monitor) via a fault or trap. The operation is also safe because the requestor context (embedded VM) must have equal or better permissions than the context being affected by the update (guest VM). Page permissions in the affected context or guest VM may later be restored by the requestor context or embedded VM. Additional checks can be made by the processor restricting which VMIDs have permission to execute the page flipping instructions as defined by the VMM.

In addition to updating the permissions in the EPTE structure for the affected page and VMID, the processor may log the change in another data structure in memory to record the event, or in available bits in the affected EPTE structure itself. This way, the monitor will be able to root cause a fault, trap or VM Exit caused by the permission change. A goal of the processor native solution is that no VMM invocation is required. The processor will natively switch the page permissions within another VM's context, allowing the embedded VM exclusive access to the page until control is returned to the guest VM.

Various embodiments provide for a processor instruction that can transfer ownership of a page mapping from one program to another. In embodiments, the processor instruction may be invoked by a first program to change permissions in one or more page tables owned by a second program. Here, the first program owns one or more page tables and the second program owns one or more page tables. The processor instruction verifies that the one or more page tables owned by the first program and the one or more page tables owned by the second program have consistent mappings for a physical page table in memory. In embodiments, the first program has better or higher privileged page permissions to the physical page table than the second program. In embodiments, the processor instruction then changes the page permissions in the one or more page tables owned by the second program from 'read only' to 'read and write'.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   at least one processor;
   an embedded virtual machine (VM) hosted by a platform including the at least one processor; and
   a guest VM,
   wherein both the embedded VM and the guest VM have mappings for a physical page table in at least one memory coupled to the at least one processor and included on the platform,
   wherein the embedded VM has equal or better permissions to the physical page table than the guest VM,
   wherein the embedded VM is configured to flip permissions on one or more pages in the physical page table for the guest VM such that the permissions are flipped from 'read and write' to 'read-only';
   wherein exclusive control of the embedded VM to the physical page table occurs without invoking a virtual machine monitor (VMM).

2. The system of claim 1, wherein the embedded VM has exclusive control to the physical page table once the permissions are flipped for the guest VM.

3. At least one non-transitory storage medium having instructions stored thereon for causing an embedded virtual machine (VM) to:

flip permissions on one or more pages in a physical page table for a guest VM such that the permissions are flipped from 'read and write' to 'read-only';

wherein both the embedded VM and a guest VM have mappings for the physical page table in memory;

wherein the embedded VM has equal or better permissions to the physical page table than the guest VM;

wherein exclusive control of the embedded VM to the physical page table occurs without invoking a virtual machine monitor (VMM).

4. The at least one medium of claim 3 wherein the embedded VM has exclusive control to the physical page table once the permissions are flipped for the guest VM.

5. At least one non-transitory storage medium having instructions stored thereon for causing a system to:

invoke at least one processor instruction by a first program to change page permissions in one or more page tables owned by a second program, wherein the first program owns one or more page tables and the second program owns one or more page tables;

verify by the at least one processor instruction that the one or more page tables owned by the first program and the one or more page tables owned by the second program have consistent mappings for a physical page table in memory, wherein the first program has higher privileged page permissions to the physical page table than the second program;

change by the at least one processor instruction the page permissions in the one or more page tables owned by the second program; and cause the first program to obtain exclusive control to at least a portion of the physical page table without invoking a virtual machine monitor (VMM);

wherein the first and second programs include virtual machines.

6. The at least one medium of claim 5, wherein changing the page permissions in the one or more page tables owned by the second program comprises changing the page permissions from 'read only' to 'read and write'.

7. An apparatus comprising:

at least one memory and at least one processor, coupled to the at least one memory to perform operations comprising:

invoking at least one processor instruction by a first program to change one or more page permissions in one or more page tables owned by a second program, wherein the first program owns one or more page tables and the second program owns one or more page tables;

verifying by the at least one processor instruction that the one or more page tables owned by the first program and the one or more page tables owned by the second program have consistent mappings for a physical page table in memory;

changing by the at least one processor instruction the one or more page permissions in the one or more page tables owned by the second program, the first program having a higher privileged page permission to the physical page table than the second program; and the first program obtaining exclusive control to at least a portion of the physical page table without invoking a virtual machine monitor (VMM);

wherein the first and second programs include virtual machines.

8. The apparatus of claim 7, wherein changing the one or more page permissions in the one or more page tables owned by the second program comprises changing the one or more page permissions from 'read only' to 'read and write'.

9. The at least one medium of claim 5 including instructions to cause the first program to obtain the exclusive control to at least a portion of the physical page table after changing the page permissions in the one or more page tables owned by the second program.

10. The apparatus of claim 7, the operations comprising the first program obtaining the exclusive control to at least a portion of the physical page table after changing the one or more page permissions in the one or more page tables owned by the second program.

* * * * *